United States Patent
Davis et al.

(10) Patent No.: US 7,107,344 B2
(45) Date of Patent: *Sep. 12, 2006

(54) CONNECTION ALLOCATION TECHNOLOGY

(75) Inventors: Gordon Taylor Davis, Chapel Hill, NC (US); Clark Debs Jeffries, Durham, NC (US); Mark Anthony Rinaldi, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 838 days.

This patent is subject to a terminal disclaimer.

(21) Appl. No.: 09/931,540

(22) Filed: Aug. 16, 2001

(65) Prior Publication Data

US 2003/0041146 A1 Feb. 27, 2003

(51) Int. Cl.
*G06F 15/16* (2006.01)

(52) U.S. Cl. .................... 709/227; 709/237; 370/230

(58) Field of Classification Search ........ 709/220, 709/225–228, 235, 237; 702/181; 370/412, 370/431, 230, 235; 708/250; 710/29, 56; 703/13, 23

See application file for complete search history.

(56) References Cited

U.S. PATENT DOCUMENTS

| | | | |
|---|---|---|---|
| 5,347,511 A | 9/1994 | Gun | 370/54 |
| 5,687,167 A | 11/1997 | Bertin et al. | 370/254 |
| 5,838,921 A | 11/1998 | Speeter | 395/200.57 |
| 5,859,976 A | 1/1999 | Hoag | 395/200.47 |
| 6,003,084 A | 12/1999 | Green et al. | 709/227 |
| 6,035,418 A | 3/2000 | Recio et al. | 714/18 |
| 6,073,176 A | 6/2000 | Baindur et al. | 709/227 |
| 6,078,583 A | 6/2000 | Takahara et al. | 370/356 |
| 6,175,879 B1 | 1/2001 | Shah et al. | 709/330 |
| 6,226,277 B1* | 5/2001 | Chuah | 370/328 |
| 6,243,667 B1* | 6/2001 | Kerr et al. | 703/27 |
| 6,449,647 B1* | 9/2002 | Colby et al. | 709/226 |
| 6,466,985 B1* | 10/2002 | Goyal et al. | 709/238 |
| 6,483,805 B1* | 11/2002 | Davies et al. | 370/235 |
| 6,507,577 B1* | 1/2003 | Mauger et al. | 370/356 |
| 6,690,645 B1* | 2/2004 | Aweya et al. | 370/230 |
| 6,771,652 B1* | 8/2004 | Aydemir et al. | 370/412 |
| 6,775,692 B1* | 8/2004 | Albert et al. | 709/207 |
| 6,788,697 B1* | 9/2004 | Aweya et al. | 370/412 |

(Continued)

OTHER PUBLICATIONS

Siwko, J. and I. Rubin, Connection Admission Control for Capacity-Varying Networks with Stochastic Capacity Change Times, IEEE/ACM Transactions on Networking, vol. 9, No. 3, Jun. 2001, pp. 351-360.*

(Continued)

*Primary Examiner*—Andrew Caldwell
*Assistant Examiner*—Benjamin A. Ailes
(74) *Attorney, Agent, or Firm*—Joscelyn G. Cockburn; Daniel E. McConnell

(57) ABSTRACT

A method and apparatus useful in network management which makes intelligent, high speed, connection allocation decisions, overcoming difficulties encountered heretofore and providing enhanced network services. During episodes of network congestion, some connection requests for a class of service of low value and with currently a high number of existing connections may be purposefully ignored (not acknowledged with an Acknowledge (ACK) packet) so that the processing capability of a device will not become overwhelmed, causing the dropping of new connection is to note the numbers of connections of different classes relative to their service-level contracts, to ignore abundant, low-value connection requests in accordance with value policies when and only when necessary, and to insure that valuable new connection requests that conform to their contract connection rates can be intelligently accommodated.

24 Claims, 9 Drawing Sheets

U.S. PATENT DOCUMENTS 6,856,596 B1 * 2/2005 Blumer et al. .............. 370/230
6,870,811 B1 * 3/2005 Barker et al. ............... 370/235

OTHER PUBLICATIONS

Kaj, Ingemar, "Stochastic Modeling in Broadband Communications Systems," Lecture Note Series of the Laboratory for Research in Statistics and Probability, No. 327, Jan. 1999, Ch. 6, pp. 106-128.*

Kuo, Geng-Shen, Po-Chang Ko and Min-Lian Kuo, "A Probabilistic Resource Estimation and Semi-Reservation Scheme for Flow-Oriented Multimedia Wireless Networks," IEEE Communications Magazine, Feb. 2001, pp. 135-141.*

Pending Patent Application, , B. Gorti et al., Method and System for Providing Differentiated Services in Computer Networks, U.S. Appl. No. 09/448,197, filed Nov. 23, 1999.

Pending Patent Application, , B. Gorti etl al., Method and System for Controlling Flows in Sub-Pipes of Computer Networks, U.S. Appl. No. 09/540,428, filed Mar. 31, 2000.

Pending Patent Application, K. J. Barker et al., "Quality of Service Functions Implemented in Input Interface Circuit Interface Devices in Computer Network Hardware", U.S. Appl. No. 09/764,954, filed Jan. 18, 2001.

* cited by examiner

FIG. 4

200 low speed
Connection min and max values, pipe identifiers initialized in NIC

--- moderate speed
Current connection numbers and congestion signals collected and made available to algorithm Algorithm refreshes probability of connection for different classes of service

--- high speed
New sessions request connections and connection decisions made

1. min and max numbers of connections declared by administrator 2. coordinates of paths of traffic classes declared 3. paths using a common NIC source port collected in a set 4. Ci and Di coefficients computed for each pipe 5. Ci and Di entered in registers used in CAT calculation 6. congestion signals defined using path coordinates and resource limits

NIC with CAT

Update connection probability table

Timer awakens program with period Dt

Fetch B, E values from registers

Update E and store

Fetch Ri, Ci, Di, Pi values from registers

Update Pi for each i and store in table of Pi values

CAT connection control refreshes
connection fractions Pi for pipes

Timer with period Dt awakens CAT.

New connection fractions computed per pipe.

Results stored in a table.

| pipe number i | Connection fraction Pi |
|---|---|
|  |  |
|  |  |
|  |  |

502

504

506

CONNECTION ALLOCATION TECHNOLOGY

RELATED APPLICATIONS

This application is related to, and contains common disclosure with, co-pending and commonly assigned patent applications:

"Method and System for Providing Differentiated Services in Computer Networks," Ser. No. 09/448,197, filed Nov. 23, 1999 now U.S. Pat. No. 6,657,960;

"Method and System for Controlling Flows in Sub-Pipes of Computer Networks, Ser. No. 09/540,428, filed Mar. 31, 2000;

"Quality of Service Functions Implemented in Input Interface Circuit Interface Devices in Computer Network Hardware", Ser. No. 09/764,954, filed 18 Jan. 2001 now U.S. Pat. No. 6,870,811.

Each of these co-pending patent applications is hereby incorporated by reference into this description as fully as if here represented in full.

FIELD OF INVENTION

This invention is related to data communications and particularly to the flow of streams of data through pathways such as are provided within and between computer systems, in internal and external networks.

BACKGROUND OF INVENTION

In today's networked world, data communication is a critical resource. Increasing network traffic, driven by the Internet and other emerging applications, strains the capacity of network infrastructures. To keep pace, organizations are looking for better technologies and methodologies to support and manage traffic growth.

Today's dramatic increase in network traffic can be attributed to the popularity of the Internet, a growing need for remote access to information, and emerging applications. The Internet alone, with its explosive growth in e-commerce, has placed a sometimes unsupportable load on network backbones. It is also the single most important cause of increased data traffic volumes that exceed voice traffic for the first time. The growing demands of remote access applications, including e-mail, database access, and file transfer, are further straining networks.

The convergence of voice and data will play a large role in defining tomorrow's network environment. Currently, the costs to a user of the transmission of data over Internet protocol (IP) networks is so low as to almost be free. Because voice communications will naturally follow the path of lowest cost, voice will inevitably converge with data. Technologies such as Voice over IP (VoIP), Voice over ATM (VoATM), and Voice over Frame Relay (VoFR) are cost-effective alternatives in this changing market. However, to make migration to these technologies possible, the industry has to ensure quality of service (QoS) for voice and determine how to charge for voice transfer over data lines. The Telecommunications Deregulation Act of 1996 further complicates this environment. This legislation will reinforce a symbiotic relationship between the voice protocol of choice, ATM (Asynchronous Transfer Mode), and the data protocol of choice, IP (Internet Protocol).

Conventional communications networks may be viewed as being composed of two types of devices: edge resources and connectivity resources. Edge resources may be workstations, servers of various types, data stores and other devices which are sources of and destinations for datagrams by which data is moved across the network. Connectivity resources are those devices which link together edge resources and provide pathways through which datagrams travel in moving between sources and destinations. Both edge and connectivity resources can be viewed as being nodes in or on a network. These views become somewhat complicated by views which distinguish between a network backbone—the principal high speed, high bandwidth "core" of the Internet for example—and the network edges. For example, a device which might be called an edge router exists at the edge of the backbone to provide connectivity between the backbone and some lesser network, which in turn has its edge resources. For purposes of this description, such a device is an edge resource.

In conventional communications networks prior to this invention, bandwidth has been viewed as a dominant issue. Much effort has been directed to broadening bandwidth and to allocating use of bandwidth. A discussion of allocating bandwidth can be found by the interested reader in PCT patent application WO 01/39467 A1 published on 31 May 2001, to which such readers are directed and in which a technology known as Bandwidth Allocation Technology (BAT) is described. In management of conventional networks as there described, flow control is a method or methods (several are described in the publication identified above) for transmitting or discarding frames or packets in a stream of data.

The discussion there and here presupposes certain knowledge of network data communications and apparatus and methods used in such communications networks as has here been briefly mentioned. The discussion also presupposes a fundamental understanding of bit strings known as packets and frames which make up data streams in such network communication. Conventional approaches may provide for classes of data flow to be recognized, as in differentiated services (also known as DiffServ), where each frame or packet (the terms are here used interchangeably) belongs to a class. The default class of service is commonly known as Best Effort. In what is here called Strong Quality of Service, traffic is organized into objects that pass edge-to-edge in network paths—from an origination point to a destination point—as well as in classes. Such paths are often called pipes, and that terminology will be used here.

A switch is a network node that is a connectivity resource which directs datagrams on the basis of Medium Access Control (MAC) addresses, that is, Layer 2 in the OSI model well known to those skilled in the art [see "The Basics Book of OSI and Network Management" by Motorola Codex from Addison-Wesley Publishing Company, Inc., 1993]. A switch can also be thought of as a multiport bridge, a bridge being a device that connects two LAN segments together and forwards packets on the basis of Layer 2 data. A router is a network node and connectivity resource that directs datagrams on the basis of finding the longest prefix in a routing table of prefixes that matches the Internet Protocol (IP) destination addresses of a datagram, all within Layer 3 in the OSI model.

A Network Interface Card (NIC) is a device that may interface a network such as the Internet with an edge resource such as a workstation, server, cluster of servers, or server farm. A NIC might classify traffic in both directions for the purpose of fulfilling Service Level Agreements (SLAs) regarding Quality of Service (QoS). At the time of this writing, one definition of a Service Level Agreement is a contract between the provider and the user that specifies the level of service that is expected during its term. SLAs are used by vendors and customers as well as internally by IT shops and their end users. They can specify bandwidth availability, response times for routine and ad hoc queries, response time for problem resolution (network down, machine failure, etc.) as well as attitudes and consideration of the technical staff. SLAs can be very general or extremely detailed, including the steps taken in the event of a failure. Similarly, a definition of Quality of Service is the ability to define a level of performance in a data communications system. For example, ATM networks specify modes of service that ensure optimum performance for traffic such as realtime voice and video. QoS has become a major issue on the Internet as well as in enterprise networks, because voice and video are increasingly travelling over IP-based data networks that were not designed for continuous speech or video. Thus, transmissions are broken into packets that can travel different routes and arrive at different times. A NIC may also switch or route traffic in response to classification results and current congestion conditions. The present description considers a network node to be a switch, a router, a NIC, or, more generally, a machine capable of both switching and routing functions based upon classification results and current congestion conditions.

The number of simultaneous connections, such a TCP sessions, supported by a computer apparatus can be many thousands or millions. In general, however, different connections have different economic values, as determined at least in part by management policies.

The use of simple connection allocation techniques in communications networks has been known in the prior art. In a conventional computer system, connection allocation might be simply to ignore connection requests when the number of current connections of a class reaches a certain level. A more advanced system might ignore requests randomly, with the probability of ignoring requests being periodically updated in response to connection numbers and connection capacity. A drawback with the simple prior art techniques is that the decision to allow or ignore a connection request is made in a device based upon heuristically determined thresholds or functions.

In view of the above, more efficient apparatus and methods are required to make connection allocation decisions in high speed networks.

SUMMARY OF INVENTION

The detailed description which follows describes a method and apparatus for making intelligent, high speed, connection allocation decisions and thereby overcoming difficulties encountered heretofore and providing enhanced network services.

For the purpose of brevity, the term "Connection Allocation Technology (CAT)" in the present document will be used to refer to methods and apparatus which may include all logical types of network nodes: switch, router, or switch/router, NIC, or even more generally, any machine that conveys or processes connection requests using Transmission Control Protocol (TCP) or a similar connection-oriented protocol for the purpose of transmission of datagrams. Connection requests arrive unpredictably and must be momentarily stored and then connected (using a Synchronization (SYN) packet) or ignored (causing a timeout at the sender and possibly a subsequent attempt at reconnection). All this must be based upon destination and value information in one or more headers and current congestion conditions for each destination and value combination.

Any device that supports CAT (here sometimes a "CAT device") will have finite storage capacity for use in storing connection requests and finite capacity for handling connected sessions (for example, in recording existing sessions in a table for the purpose of fast path handling of existing sessions). During episodes of congestion, some connection requests for a class of service of low value and with currently a high number of existing connections may be purposefully ignored (not acknowledged with an Acknowledge (ACK) packet) so that the processing capability of the device will not become overwhelmed, causing the dropping of new connection requests without regard to their value. Thus the purpose of intelligent connection allocation is to note the numbers of connections of different classes relative to their service-level contracts, to ignore abundant, low-value connection requests in accordance with value policies when and only when necessary, and so to insure that valuable new connection requests that conform to their contract connection rates can be intelligently accommodated by CAT.

Intelligent accommodation by CAT means that the decision to allow and acknowledge a new connection is in general probabilistic. That is, for class number i (with i=1, 2, ..., N), there is a probability Pi over a time interval Dt that any new connection in class i will be acknowledged (allowed). The value of each Pi is refreshed every Dt time units based upon current congestion and connection number information. The goal of this mechanism is intelligent connection allocation, defined as follows:

1. if the number of present connections of a given class i is below a minimum guaranteed number (min–i), then the probability Pi of allowing a new connection of the given class i in the next time interval Dt is 1.
2. if the number of present connections of a given class i is above a minimum guaranteed number (max–i), then the probability Pi of allowing a new connection of the given class i in the next time interval Dt decreases exponentially toward 0.
3. otherwise, the probability Pi of allowing a new connection in a given class i is adjusted every Dt time units to achieve high utilization, that is, to increase the number of connections as much as possible.

One embodiment of the present invention is distinguished by the characteristic that the connection decision is based upon preprocessed value or class of service information in a packet header. Thus the connection decision can be made upstream of complicated classification and routing functions. Therefore, the present invention prevents or reduces congestion and inefficiency by proactively allowing only connections that can be accommodated through completion.

The present invention also honors SLAs regarding min and max connection numbers with administrative simplicity. By controlling Best Effort connections, the present invention releases computing and storage resources for processing the more valuable types of traffic when congestion of finite resources makes processing of all requested connections to completion impossible. It also makes administration of SLAs simple and reliable, all while achieving high utilization of connection resources.

Another distinguishing characteristic of the present invention is that a signal called excess bandwidth signal B=0 or 1 is not determined by the behavior of one resource in a switch, but rather is in a preferred embodiment defined as a regular expression of AND, OR, and NOT operations of various signals. Specifically, the upstream side of CAT connection decisions senses a combination of congestion indications from downstream resources.

A logical class of service (also referred to here as a pipe) consists of an edge-to-edge path through a network and a logical aggregation of some connections that use that path. To each CAT device is associated a set of pipes, the pipes that pass through the CAT device. In the present invention, the value of B is determined by the states of all downstream resources fed by pipes passing through the CAT device. At any rate, B is a regular expression of the states of a plurality of resources that is periodically reported to and used by the decision-making mechanism in CAT.

DESCRIPTION OF DRAWINGS

Some of the purposes of the invention having been stated, others will appear as the description proceeds, when taken in connection with the accompanying drawings, in which:

FIG. 4 shows the entrance of datagrams into a NIC with CAT or other CAT device and a decision made by CAT connection control to allow or ignore the connection request.

FIG. 6 shows details of connection management initialization tasks.

FIG. 8 shows details of the connection request decision in each CAT implementation.

FIG. 9 shows connection request allowance probability table calculation and structure.

DETAILED DESCRIPTION OF EMBODIMENTS

Figure 1:
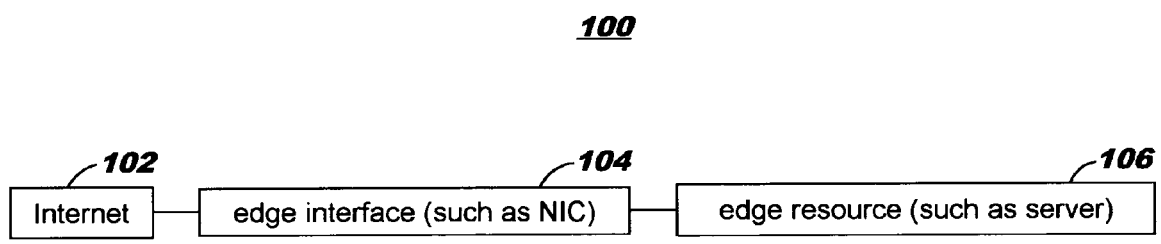
FIG. 1 illustrates a computer network connected through an edge interface (such as a NIC) to an edge resource (such as a server or server cluster).

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

A key foundation of the present invention is the use of control theory in place of intuitive methods. Within this discussion, control theory is embodied in a type of connection decision-making called Connection Allocation Technology (CAT), which is characterized by the following six Properties A, B, C, D, E, F. The Properties are explained for the present description as follows:

Property A. If the total number of connections that can be accommodated of all types is denoted C and if the maximum rate of presentation of new connection requests is S, then a time interval Dt is defined by Dt=C/(8*S). The maximum possible increase of the number of current connections in any time interval Dt is a fraction K of connection capacity. A preferred value of K is ⅛.

Property B. CAT uses an Excess Connection Capacity Signal B=0 or 1 that summarizes the condition of downstream resources insofar as the pipes that are aggregated in one implementation of CAT are concerned. For example, B could be a threshold function of the number of connections in a local session table. B is computed every time connection probability transmit probabilities {Pi} are computed. If B is consistently 1, then all pipes' connection requests may be 100% allowed without causing congestion in switch resources that would compromise performance parameters contained in Service Level Agreements (SLAs). If B is consistently 0, then the fractions of allowed connection requests for all pipes will be reduced until each the number of connections for each pipe is at least its guaranteed number but possibly no more. B can be defined in terms of a combination of signals from connection numbers or queue occupancy numbers relative to thresholds (so B=1 if such a number is below a threshold, else B=0). Alternatively B might be defined in terms of the rate of change of a connection numbers or queue occupancy numbers (so B=1 if such a number is decreasing or very low, else B=0). The precise construction of B is not critical to the present invention. Only the above implications for all 1 or all 0 values of B are critical.

Property C. CAT further computes the exponentially weighted average E of excess connection capacity values B. In a preferred embodiment, the value of E at time t+Dt is computed by E(t+Dt)=(1−W)*E(t)+W*B(t) where E(t) is the value of E at time t and B(t) is the value of B at time t. As is well known to those skilled in the art, the weight in this equation is W. In a preferred embodiment the value of W is 1/32. Other values such as 1/16 or 1/64 might be used as equally suitable. The critical aspect is that E is some reasonable smoothing of B signals.

Property D. CAT examines each pipe and if the current allowed connection number Ri (number of current connections or sessions in pipe i) in the pipe is below its minimum connection rate (called herein the min of the pipe, or, for pipe i, called min-i), then after at most a few iterations, new connection requests are automatically 100% allowed by CAT.

Property E. CAT further examines each pipe and if the current allowed connection number Ri of the pipe is above its maximum upper limit (called herein its max, or, for pipe i, called max−i), then after at most a few iterations, the connection probability fraction Pi (probability that a new connection request for pipe i is allowed) is reduced until the connection number is at or below max.

Property F. CAT further examines each pipe not already at or below its min connection number or above its max connection number and uses B as follows. If B=1, then the connection probability fraction Pi(t+Dt) at time t+Dt for pipe i is increased as follows: Pi(t+Dt)=Pi(t)+Ci*E(t)*Pi(t) where Ci is a constant determined at initialization by methods described below. Furthermore, if B=0, then the transmit fraction Pi(t+Dt) at time t+Dt for pipe i is decreased as follows: Pi(t+Dt)=Pi(t)−Di*Ri(t)/C where Di is a constant determined at initialization by methods described below and Ri(t) is the current connection number, and C is the maximum possible number of connections of all types.

In Properties C and F and throughout the remainder, the symbol * designates multiplication.

In a preferred embodiment, the present invention further focuses on the datagrams or packets flowing into a device in which CAT is implemented. After a datagram enters a device with CAT and, if necessary, is converted by use of well known prior art techniques into digital data, there is an opportunity exploited by the present invention to test just the first part, that is, the contents of headers, of the datagram for its membership in one or another class of service (herein called a pipe). After determination of pipe membership, which might be membership in a premium Assured Forwarding pipe with a positive guaranteed connection number min or in a Best Effort pipe with no such connection number guarantee, the corresponding value of a new connection probability is selected from a table of new connection allowance fractions (table). The table itself is periodically refreshed in response to connection numbers for and in response to a binary congestion signal from the device with CAT. The refresh period is Dt defined as above by the equation $Dt=C/(8*S)$ where C is the maximum number of connections of all types that can be supported simultaneously and S is the maximum rate at which new connection requests could ever arise. The table is further refreshed in light of certain constants per pipe that are declared at initialization on the basis of global pipe paths and connection contract values. Then the connection probability from the table is compared to the current state of a high speed random number generator and the result of the comparison is used to decide by CAT whether to allow the new connection (by responding to the request with a SYN packet or the logical equivalent) or not to allow the new connection request (by simply ignoring it).

For the purpose of this description, the term CAT is intended to cover the present invention implemented in any of various low layer functions, including but not limited to a PHY, a Media Access Control (MAC) for Ethernet systems, or a Framer (in Packet over Sonet systems). The present invention might also be implemented after those devices and after a hardware classifier that might also discern pipe membership. Those skilled in the art will readily recognize the logical parallels since all such devices are conduits of datagrams into a device (such as a server cluster) and so all such devices could be sites of proactive, intelligent connection allocation policies Network interface cards (NICs) and logically analogous devices as described above in a network [see FIG. 1] pass datagrams with well known header and payload structures (generally nested) [see FIG. 2]. NICs are commonly connected by optical fiber or copper wire to the Internet or other network on one side and to a server or cluster of servers on the other side [see FIG. 1].

The connection allocation mechanism of the present invention extracts header information that correlates each datagram to a specific aggregate flow or pipe. The information might be the Differentiated Services Code Point [described in IETF RFC Reference RFC 2474 Definition of the Differentiated Services Field (DS Field) in the IPv4 and IPv6 Headers. K. Nichols, S. Blake, F. Baker, D. Black. December 1998. (Obsoletes RFC1455, RFC1349) (Status: PROPOSED STANDARD) incorporated herein by reference] in the Type of Service byte [see FIG. 2]. The information is used to select a transmit probability value from a table [see FIG. 5] and that table value is compared to a random number to make the connection decision. Also at the rate of new connection request arrivals, the number of current connections in each pipe is updated to provided input to the CAT calculation of transmit probabilities in the table. Such a design for implementing connection allocations is largely independent of the NIC design, provided the downstream resources (such as a fast path connection table with statistics for each pipe) can communicate congestion information to the CAT implementation in a certain manner. Only the simplest signal from the resources to CAT is required, namely, a current binary value reflecting the congestion state of shared resources in the switch that are used by the pipes passing through the given CAT [see FIGS. 6,7]. Enhanced functionality may be achieved by providing multiple congestion indications, that is, one per output port of the NIC, should the NIC route connections to multiple ports.

There are four logical tasks of CAT proceeding at three markedly different speeds. At low speed, the invention updates administrative information provided at initialization [see FIG. 8] on the path coordinates and characteristics of aggregate flows (herein called pipes). At moderate rate, the device then uses congestion signals in the CAT connection control algorithm to compute connection request approval probabilities per pipe. The connection approval probabilities are in part derived from congestion signals from the server or servers, also at moderate rate [see FIG. 9]. Furthermore, counters at connection request arrival rate must record per pipe connection numbers. Also at new connection request arrival rate, the CAT probabilistically approves or ignores new connection requests in accordance with the connection approval probabilities. Only the last function, probabilistic connection approval decisions, must reside in the data path part of CAT. The other functions could be moved to a Flow Information Organization function residing in the NIC fronting the server or server cluster.

In FIG. 1, reference 100 indicates an abstraction of a computer network 102 connected through an edge interface 104 such as a Network Interface Card (NIC) to an edge resource 106 (such as a server or server cluster). The present invention might also pertain to a Firewall (FW) or any other logically similar device connecting a network such as the Internet to an edge resource or set of edge resources such as a set of devices in a protected subnet.

The overall goal, according to the present invention, of moving enforcement of intelligent connection allocation policies to a position upstream of the edge resource is to more closely approximate a kind of ideal connection allocation for Quality of Service (QoS). During episodes of congestion, the connection control mechanism will disregard intelligently some incoming requests for new connections, namely, the connections that due to congestion, would probably not be supported to completion through several bursts of frames (in TCP several TCP congestion windows). Furthermore, the present invention considers connection guarantees sold to different classes of service (aggregated in pipes). This increases efficiency of classification, routing, and data retrieval mechanisms in the interface and in the edge resource since processing and packet storage capacity are not wasted on packets that must eventually be resent following some frame drops. In other words, the present invention simply disallows connections that would not be efficiently and promptly supported anyway, to the mutual benefit of other conformant connections and arguably even to the benefit of the disallowed connections (since they are only connected when they really have the potential of a support through session completion).

QoS in the present invention is defined in terms of logical pipes. All traffic is assumed to be in some QoS aggregate flow class or pipe. If all traffic is Best Effort (BE), then the present invention can result in the benefit that all sessions that are allowed are also completed. In the case that multiple traffic types occur, we assume that traffic is organized by class of service into pipes. The path of each pipe through a NIC or FW or analogous interface device comprises the coordinates of its source port, path through device, and target port. Such a path is actually a piece of the path of the pipe through a network from "edge-to-edge," where the term edge might mean an individual workstation, a server, an autonomous system, or other computer network source entity. As explained below, certain coefficients for linearly increasing flows during periods of excess connection capacity and for exponentially decreasing flows otherwise are determined at initialization from global knowledge of all resources and Service Level Agreements (SLAs). The function of connection control is use of these coefficients to disregard some connection requests intelligently and as required by congestion conditions.

The effect of using connection control upstream of the edge resources is an efficient implementation of Strong QoS with quantitative connection performance guarantees edge-to-edge.

The processing capability of the interface (with a given complement of filter rules, routing tables, or other lookup mechanisms) is assumed to be known. This knowledge leads to the concept of an excess connection capacity signal B=1 or 0 for each implementation of CAT.

This signal is defined to be 1 if all the pipes passing through a given interface with CAT and into the edge resource are currently passing through mechanisms in the interface causing zero discards, acceptable latency, and acceptable jitter, or in other words, meeting all SLAs. Thus B could be defined by some combination of ANDs or ORs or NOTs of current connection numbers pipe by pipe, that is, by comparing said numbers of connections in local session tables with thresholds or by comparing the rates of change of said numbers with thresholds or by a combination of said comparisons. The precise definition of B is not critical. Rather, B is required to exhibit only two extreme behaviors.

Namely, if, to repeat, the B value communicated from the switch to the interface with CAT is consistently 1, then the system is serving all the pipes in accordance with all related SLAs. If B is always 0, then there are some connections of some pipes, or some latency or jitter statistics, which are not in accordance with at least one SLA or possibly nearly so. The eventual consequence of consistent B=1 signals is that all new connection requests of the pipes in the interface with CAT are 100% allowed, subject to max limits. The eventual consequence of consistent B=0 signals is that all new connection requests for all pipes in the interface with CAT are allowed with probability fractions sufficiently large to meet all their guaranteed minimum connection guarantees (mins), but possibly not more.

An additional, fundamental assumption is that connection SLAs are sold so that if all pipes at all times have constant connection numbers less than or equal to their guaranteed minimum (min) values, then the excess connection capacity signal is always 1. At such offered connection loads, all SLAs of all pipes using the interface with CAT are honored.

In one embodiment, several B signals could be multiplexed by means of a Time Division Multiplex (TDM) system for efficient communication of connection congestion information. Each B signal might then represent congestion (or absence of congestion) in a particular connection table or output blade or port. Then within a particular interface with CAT, connection control could be applied independently on groups of pipes sharing a common connection table or output blade or port. Advantageously, decisions to disregard connection requests of a pipe would be focused only on pipes destined for congested connection tables or output blades or ports, while even Best Effort connection requests involving only noncongested connection tables or blades or ports would be allowed.

Figure 2:
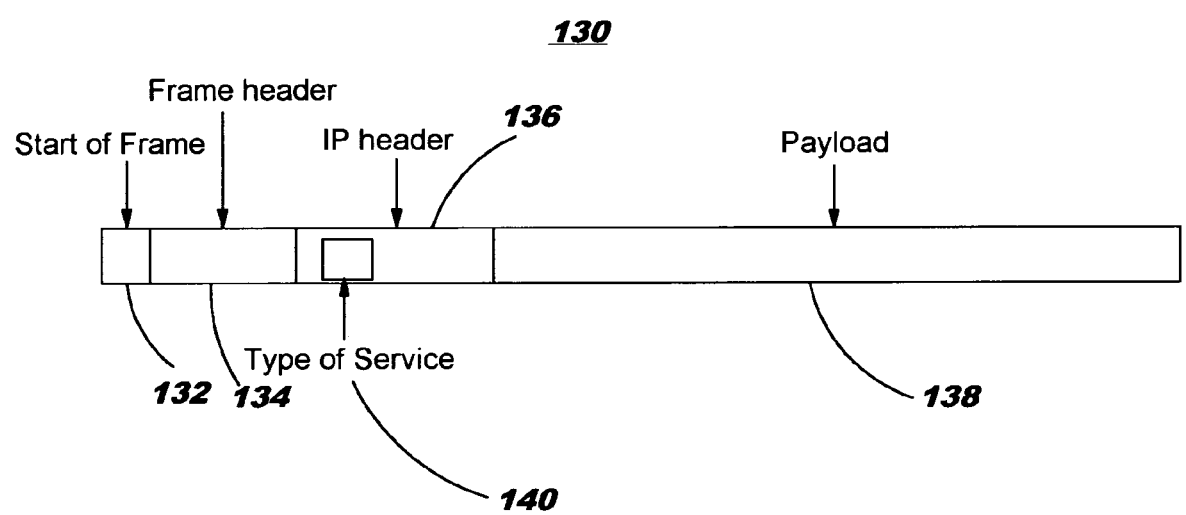
FIG. 2 shows a schematic of headers and payload of a representative datagram.
Figure 3:
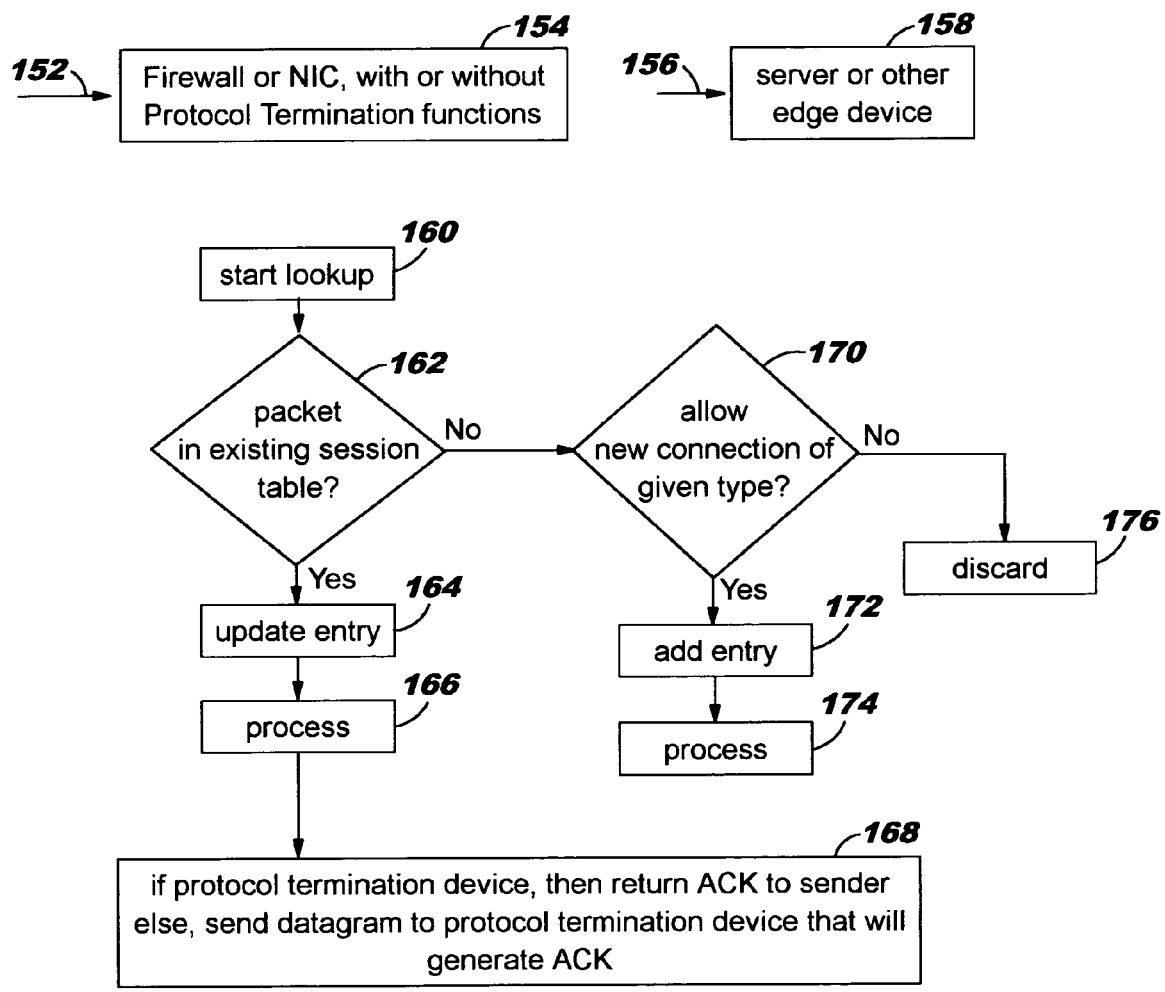
FIG. 3 shows the flow of data to and from a network through NIC or other interface supporting CAT.

The context of this section is shown in FIGS. 2, 3, and 4.

As is well known to those skilled in the art, computer networks transmit data in the form of datagrams with a structure consisting of a header and a payload [see FIG. 2]. The payload (or "data") itself may be comprised of headers of different organizational levels, for example, Ethernet (Link Layer), IP (Network Layer), TCP (Transport Layer).

In the important case of Ethernet, the frame format is established by the Standard ISO/IEC 8802–3: (1996E), ANSI/IEEE Std. 802.3, 1996 Edition. The format is <inter-frame><peamble><sfd><eh><data><fcs> where inter-frame is a gap between datagrams, preamble is a coded sequence of bits designating that a frame is about to arrive, sfd is start of frame delimiter, eh is Ethernet header, data is the Ethernet payload that might consist of an IP datagram with IP header and data, and fcs is frame check sequence. In detail, the preamble is at lease seven (7) bytes of "10101010." The sfd byte is "10101011." IP accepts "packets" from the Layer 4 transport protocol (TCP or UDP), adds its own header to it and delivers a "datagram" to the Layer 2 data link protocol. It may also break the packet into fragments to support the maximum transmission unit (MTU) of the network, each fragment becoming an Ethernet frame.

In FIG. 2, reference 130 depicts in some detail the organization of datagrams needed for the present invention. A datagram is a set of bits. In IP version 4 (IPv4), the IP header must contain at least 160 bits, number 0, 1, 2, . . . Following the Start of Frame 132 and Frame header 134, the eight bits numbered 8, 9, . . . , 15 constitute the Type of Service byte 140 within the IP header 136, and in particular the DiffServ Code Point consists of the six bits number 8, 9, . . . , 13 (the other two are reserved for future standardization). Following the IP header is the payload 138. The discussion herein pertains to IPv4 but those skilled in the art will recognize that the invention could be expressed just as well in IP version 6 or any other system in which structured datagram headers have QoS information.

Clearly one method for organizing QoS in a network would be to use consistent labels as the six class of service bits in every datagram's Type of Service byte. For example, all Best Effort datagrams might be labeled with six 0 bits. Many other methods and schemes have been proposed and are known by those skilled in the art. Any such labeling can be implemented in the methods and apparatus here described.

In one embodiment of the present invention, the interface is connected to the network via Ethernet links. A link is rated at some number of bits per second, so a time increment in the link is equivalent to bits or bytes. Let b denote a measurement in bits and B denote a measurement in bytes. The gap between Ethernet frames is 12 B with no signal plus 1 B start of frame delimiter plus 7 B of preamble. Thus the inter frame gap is 20 B. A frame itself may be from 64 B to 1518 B. The Differentiated Services Code Point (DSCP) is a set of 6 bits in the Type of Service byte in the IP header.

In FIG. 3, the logical positioning and functioning of an interface with CAT is shown. Datagrams enter the interface through a link or links 152. Links are connected logically and physically to the data processing functions of the interface 154. In turn the connected sessions feed datagrams through a link 156 to the edge resource 158 (such as a server). Within the interface 154 the logic of the shown flow chart is exercised. In step 160 a lookup is started. It is determined in step 162 whether or not the session represented by the datagram is already in the session table. If yes, then the table is updated as needed. Then the datagram is processed in step 162. Step 168 reveals that if the interface is also a protocol termination device, then an acknowledgment packet (ACK) is generated and sent. Else step 168 reveals that the datagram is sent to an edge device in which protocol termination resides and that edge devices generates and sends the acknowledgment (ACK). If the packet is not in the session table, then step 170 is taken, namely, a decision is made by CAT whether or not to allow a new connection of the given class. If the decision is yes, then in step 172 a new entry is added to the session table. Then in step 174 the packet is further processed, which might include protocol termination as before in step 168. If the decision in step 170 is no, then the packet is simply discarded in step 176.

Throughout all that follows, the first frame in a session is presumed to be distinguished by some header information, for example, the TCP flag SYN in the TCP header. These and only these frames are considered by CAT in the following way. If the distinguished first frame is detected, a connection decision must be made. The decision depends in turn upon reading the DSCP (6 bits). The DSCP is mapped to one of $N<=64$ connection probabilities (N=number of classes of pipes entering the edge resource through the given interface with CAT). SYN packets that arrive from different sources with the same DSCP are treated in aggregation. For each aggregation or pipe i, a connection request allowance probability $P_i$ is computed by connection control in CAT. Connection requests in each aggregation or pipe are allowed or disregarded.

Generically, the decision is made in the interface with CAT. A connection probability from a table with a value in [0, 1] is compared to the current value of a random number in [0,1]. If the connection probability is >=the random number, then the frame is connected. Else it is disregarded, meaning that the sender never receives an acknowledgment (such as a TCP ACK packet) that indicates the end-to-end connection is established.

Further details of connection control in an interface with CAT are also depicted in FIG. 3 at reference 150. An interface with CAT 154 first determines if the IP five-tuple or other header identification information designates the datagram as a member of an existing session. If yes, then the session is looked up in a connection table and the stored action vector for the connection is enforced. If no, then the identifying bits are fed to an adminstrative center for complete analysis. Here the CAT connection decision is made. If the connection is allowed, then four steps follow, as shown. Namely, an Acknowledgement (ACK) packet is returned to the sender, the connection actions are computed, the new connections and actions are entered in the table, and the edge resource such as a server is notified. If the connection request is not allowed, then the procedure ends, possibly with some statistical record of the end.

As mentioned before, the four levels of CAT function within three different time scales (low speed, moderate speed, and high speed) are depicted in FIG. 4, reference 200.

As can be readily understood by those practiced in the art, other headers such as the MPLS header with label and experimental bits might be used in place of the DSCP to assign packets to pipes. As such, the present invention could be practiced in other forms to provide the above benefits in terms of proactively admitting new connections or not. The goal of such proactive connection decisions would be the same: avoid inevitable connection failures after inefficiently consuming valuable processing and storage resources in the device.

Figure 5:
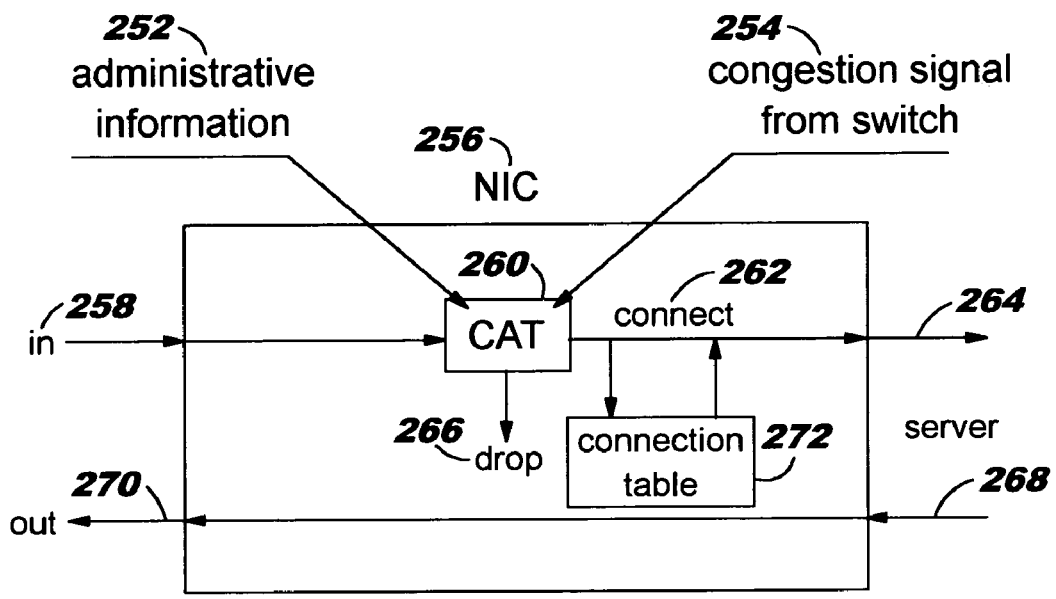
FIG. 5 shows the different time scales used in Connection Allocation Technology (CAT) connection request control.

FIG. 5, reference 250, depicts the three speeds of CAT operation as well. Administrative information 252 is supplied at initialization at low speed to the NIC 256. A congestion signal 254 is supplied at moderate speed that indicates the current numbers of connections relative to capacity and possibly other congestion information. CAT 260 runs an algorithm also at moderate speed to determine new connection allowance probabilities. When traffic enters at high speed from a link 258, CAT will either connect 262 or drop 266 the new session. If connected, then the information is also passed to a connection table 272. Subsequently transmitted datagrams in connected sessions then flow out of the interface through a link 264. Datagrams also flow from the edge resource such as a server back into the interface through another link 268 and then to the network through yet another link 270, possibly after outflowing statistics are recorded.

An excess capacity utilization signal $B=0$, 1 must be defined for use by the interface with CAT.

B can be defined in a variety of ways. For example, $B=0$ if a shared data resource that is, a packet data storage or session table, in the edge resource is depleted (by comparison to a threshold), else $B=1$. In an alternative embodiment, $B=1$ if the said resource is being restored (occupancy is decreasing by at least a certain rate), else $B=0$. Or the two said definitions might be combined in an AND operation to yield a final B value.

In another embodiment rates of change of connection numbers could be compared to threshold values to generate one or more threshold signals, with $B=1$ if all said numbers are below thresholds, else $B=0$. In yet another embodiment, combinations of connection number thresholds and rate of change of connection number thresholds could be used. Also, expected or actual bandwidth utilization of currently active sessions could become part of the definition of B.

FIG. 6, reference 300, presents a list of connection management initialization parameters and tasks. It includes min and max for each pipe, path coordinates, the calculation and storage of coefficients $C_i$ and $D_i$ for each pipe, and the calculation and storage of B.

Table 1 is a list of computational resources required by CAT in each interface.

TABLE 1

Figure 7:
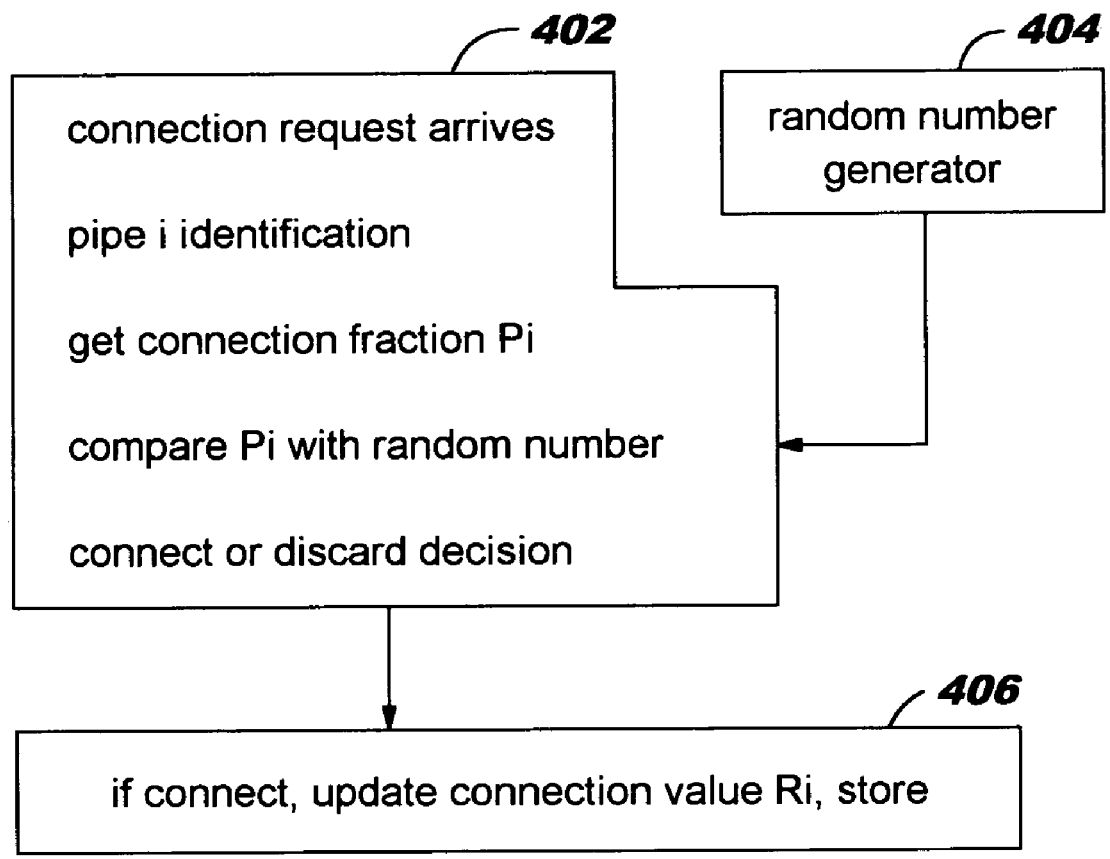
FIG. 7 shows details of the computational resources needed in a NIC with CAT.

Computational Resources per IIC registers to store constants $C_i$, $D_i$ per pipe and total connection capacity C
register to receive and store current B from downstream resource
mechanism to measure number of current allowed connections $R_i$ per pipe
mechanism to update exponentially weighted average E of excess connection capacity signal B
register to store new E
register to store $R_i$ per pipe
register to store previous connection allowance fraction $P_i$ per pipe i
logic to determine new $P_i$ per pipe i
register to store new table of $P_i$ values for each pipe i In FIG. 7, reference 400 indicates a flowchart of the decision process for permitting or not permitting a new connection in an implementation of CAT in an interface. As listed in operational block 402, the process is first the arrival of a connection request, then the identification of pipe membership, then the fetch of a connection probability, then a comparison with a random number, then a decision. Generation of the random number is accomplished in block 404. If the decision is to allow the new connection, then the number of connections for that pipe is updated and stored in block 406.

In FIG. 8. Reference 450 depicts the set of tasks needed for each update of connection allowance probabilities.

In FIG. 9, reference 500 depicts the storage table format of the values of new connection allowance probabilities {Pi} of pipes. In particular, the pipe number i 504 is an index into the table 502.

The new connection allowance probability fractions themselves (derived by an iteration of CAT flow control) are stored in adjacent memory slots 506.

The basic relationship for the periods of connection control updates and an excess connection capacity signal is the following. The total number of connections an interface and edge resource system can support is a number C of connections. The theoretical upper limit of the rate at which new connection requests could possibly arrive is assumed known and is designated by the number S of connections per second. Thus the system without connection control could theoretically go from completely empty of connections to completely full in a period of C/S seconds. The updates of connection control and the reports of B values from the edge resource to the interface with CAT should have a period Dt that is equal to a constant K times this period. In a preferred embodiment, K=⅛.

$$Dt = K*(\text{queue capacity})/(\text{maximum drain rate})$$

The multiplicand value K=⅛ is, of course, a preferred value only and not strictly necessary for the practice of the invention. The value should certainly be less than ½ to avoid severe changes in the total connection number before flow control can react. On the other hand, an excessively small value of Dt would cause unnecessary consumption of computational resources. One B value should be received during each flow control update interval Dt.

In DiffServ, the path used by a Behavior Aggregate Flow (herein called simply a pipe) is set up with Resource Reservation Protocol (RSVP) described in IETF RFC Reference: RFC 2750 RSVP Extensions for Policy Control. S. Herzog. January 2000. (Updates RFC2205) (Status: PROPOSED STANDARD) incorporated herein by reference.

The path is thought of as edge-to-edge, although the definition of an edge is flexible as has been made clear in some of the discussion above. In a preferred embodiment of the present invention, it is presumed that pipes are established and that all traffic entering an interface with CAT is organized according to DSCP values. Thus there is inherently the task of summing aggregations of flows with the same DSCP, and with that the risk of unfairness within an aggregation. However, with 14 standard DSCP values and up to 64 combinations of the 6 bits theoretically possible, it would appear that Strong QoS could be enforced at least for a limited number of pipes in a network.

Alternative embodiments might use the MPLS header to designate different pipes, including the 20-bit MPLS label and the three MPLS EXP bits. See Internet Draft "MPLS Label Stack Encoding," draft-ietf-mpls-label-encaps-07.txt, IETF Network Working Group, September 1999, E. Rosen, Y. Rekhter, D. Tappan, D. Farinacci, G. Fedorkow, T. Li, A. Conta. The present invention includes examination of all header types according to various standards from which Quality of Service (QoS) information can be conveniently and quickly extracted, all for the purpose of aggregating datagrams into a relatively small number of logical pipes passing through an interface into edge resources.

Each pipe generally passes through many shared resources. Each pipe has an SLA with a minimum connection number value (min) and a maximum connection number value (max). The offered load of connections in a pipe might be less than its min, between its min and max, or in excess of its max. If the offered load of connections is less than its min, then after at most a few adjustments of the new connection allowance transmit fraction, the requests for new connections in the pipe should be transmitted with probability 1. If the offered load of connections in a pipe (at the interface with CAT) is greater than the max of the pipe, then the new connection allowance fraction of the pipe should be reduced below 1 promptly (but not instantaneously) to reduce the pipe connection value below the max value. If the offered load of connections of pipes in an interface with CAT is between min and max values for that pipe, then connection control should be used to calculate a new connection allowance fraction for the pipe to achieve fair allocation.

As described above, if the offered load of connections in pipe i is below min–i and if the value of B is 1 (excess connection capacity exists), then the new connection allowance fraction Pi pipe i in the interface (if not already 1) is allowed to increase linearly. The coefficient Ci of the linear rate of increase for the transmit fraction Pi used by interface with CAT is defined as follows. The definition of Ci is $$Ci = (C + \text{min}i - \text{sum}\{\text{min}j\})/(128*C)$$

The multiplier 1/128 is a typical value and is not critical.

CAT also calls for use of the current connection number value Ri of pipe i. At each interface with CAT during epochs of B=0, the exponential decrease of Pi is at the rate –Di*Ri/C, for a constant Di to be defined below. The definition of Di is $$Di = (C - \text{min}i)/(128*C).$$

Again, the multiplier 1/128 here is not critical. These are the values of Ci, Di that should be sent by an administrator to an interface with CAT.

To update the new connection allowance probability Pi per pipe, each interface with CAT requires certain values.

Inputs

Constants
 Ci and Di per pipe, as well as C for the system

Input from Current Connection Measurements
 The current number of allowed connections Ri for each pipe i in the interface with CAT Input from Switch
 Composite excess bandwidth signal B defined from congestion status of all resources used by all the pipes in the interface with CAT Stored Values from Previous Iteration
 Previous new connection allowance probability Pi for each pipe i
 Previous exponentially weighted average E of B values Outputs Stored in Interface with CAT for Future Iteration
 Current transmit probability for each pipe Ti
 Current value E of exponentially weighted average of B values Sent to Hardware for use in Filling Transmit Probability Table
 Ti for each pipe i The constants Ci and Di were defined in the previous section.

In a preferred embodiment, the value of Pi is updated from values of {Pi, B, E, Ri} at time t to values at time t+Dt as follows:

If $Ri <= \text{min-}i$, then $Pi(t+Dt) = \min\{1, Pi(t)+0.125\}$

Elseif $Ri > \text{max-}i$, then $Pi(t+Dt) = 0.875 * Pi(t)$

Elseif $B=1$, then $Pi(t+Dt) = \min\{1, Pi(t)+Ci*E(t)\}$

Else $Pi(t+Dt) = \max\{0, Pi(t)-Di*Ri(t)/C\}$

Other embodiments might use related methods with linear increase of Pi when B=1 and exponential decrease of Pi when B=0.

It should be noted that the structures in the figures are only examples of implementing the circuitry in the interface with CAT and this showing should not be construed as a limitation on the scope of the invention. In particular, the very same invention could be practiced in the logically analogous context of a PHY, a MAC (Ethernet), a Framer (Packet over Sonet), or other input interface.

An overview of the implementation of the present invention in an interface with CAT is summarized as follows. New connection datagrams (such as SYN packets in TCP) for the interface arrive in links. The packet is recognized as the first in a new connection. Its pipe membership is determined. A new connection allowance probability is selected from the table. A random number is obtained and compared with the probability. If the allowance probability is >= the random number, then two actions are taken. First the new session is acknowledged so that the sender will proceed to send additional packets belonging to the session. Second, the correct interface actions are calculated for the session (detailed classification, routing, statistical measurements, remarking, or other actions). These actions in general comprise an action vector. Third, the identity of the session (such as IP five-tuple) and the action vector are entered into a fast path connection table so that subsequent packets in the same session will be recognized and acted upon expeditiously.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A method that controls the flow of datagrams including the steps of:
   a) providing, in an interface with Connection Allocation Technology (CAT), a table identifying pipes and associated new connection allowance probability for each pipe in said table;
   b) determining the identity of each datagram received in said interface by examining bits within said datagram;
   c) correlating datagram identity in step (b) with entries in the table; and
   d) allowing or disallowing a request for a new connection represented in the initial datagram of a new session based upon the value of the new connection allowance probability only if the datagram identified in step (b) matches the identity of a pipe in the table.

2. The method of claim 1 wherein numerals are used to indicate the identity of pipes and the identity of datagrams.

3. The method of claim 2 further including the steps of providing a random number generator; and allowing or disallowing a request for a new connection represented in the initial datagram of a new session based upon the value of the new connection allowance probability and a present value of the random number generator.

4. A method of managing congestion in a communications network comprising the steps of:
   operatively monitoring with a device for determining the existence of excess connection capacity, the existence of excess connection capacity within a communications device;
   generating a signal indicating existence or nonexistence of said excess connection capacity in said communications device; and
   using the generated signal to acknowledge or disregard requests for new connections in the form of initial packets of new sessions prior to initiating processing on the new connections.

5. A method comprising the steps of:
   a) determining that a datagram arriving at an interface between a network and an edge resource is the initial datagram in a sequence of datagrams associated in a common session as to which a new connection is requested;
   b) providing a table of values indicating the probability that a new connection will be allowed for each of a plurality of pipes;
   c) determining the pipe membership of a determined initial datagram by testing Quality of Service bits in said datagram and selecting from the provided table a probability value corresponding to the determined pipe membership of the determined initial datagram; and
   d) determining from the selected probability value whether establishment of a new connection will be allowed for the associated session and selectively acknowledging the determined initial datagram and allowing a new connection for the associated session based upon the determination of whether a new connection will be allowed.

6. The method according to claim 1, wherein the step of determining allowability of a session and selectively acknowledging an initial datagram further includes the steps of:
   e) providing a random number;
   f) performing a comparison of a current value of the random number with the new connection allowance probability value selected from the table of values;
   g) disregarding the initial datagram if the current state of the random number generator is greater than the new connection allowance probability value; and
   h) sending the initial datagram to an edge device or to an attached session handling device wherein an acknowledgment signal can be computed and transmitted if the current state of said random number generator is less than or equal to the new connection allowance probability value.

7. The method according to claim 6, wherein The random number and the new connection allowance probability value are both fractions between 0 and 1.0.

8. The method according to claim 5, wherein the step of determining pipe membership further includes the step of comparing administratively specified values with the value of selected fields in a packet header of the datagrams.

9. The method according to claim 8, wherein said selected fields of a packet header comprises the Differentiated Services Code Point (DSCP) field in a standard IP packet header.

10. The method according to claim 8, wherein said selected fields of a packet header comprise the components used for MPLS tunnel designation.

11. The method according to claim 5, wherein the step of determining whether a datagram constitutes a request for a new connection of a certain value further includes the step of comparing administratively specified values with the value of selected fields in a packet header of the datagram.

12. The method according to claim 11, wherein the selected fields of a packet header comprise the Transmission Control Protocol (TCP) Synchronization (SYN) field in a standard TCP packet header.

13. The method according claim 5 wherein the table of values is indexed according to pipe numbers with each corresponding table entry representing the new connection allowance probability corresponding to the associated pipe.

14. The method according to claim 5, further comprising the step of responding to actual offered loads of simultaneous connections in each of said pipes relative to guaranteed connection numbers of those pipes by altering the values in the table.

15. The method according to claim 14, further comprising the step of generating a signal indicative of the existence or nonexistence of excess connection capacity within the interface that affects a pipe flowing through the interface and wherein the altering of the table values is further responsive to the generated signal.

16. The method according to claim 15, wherein the step of generating a signal includes manipulation of multiple components each of which corresponds to excess connection capacity within an interface, and further wherein the pipes within the interface are grouped according to which shared resources within the interface are currently dedicated to the processing of the grouped pipes.

17. Apparatus comprising:
   a) a memory in which a table of pipe identifiers and associated values for new connection allowance probabilities of transmission are stored;
   b) a buffer which stores a portion of a frame determined to be an initial frame of a new session;
   c) a random number generator that periodically outputs random numbers;
   d) a controller operatively coupled to said memory, said buffer and said random number generator, said controller;
      parsing information stored in said buffer to determine a pipe membership number for the initial frame,
      determining from said table a new connection allowance probability value corresponding to the determined pipe membership number,
      comparing the probability value with a present value of the random number generator, and
      causing the initial frame to be acknowledged or disregarded based upon the result of the comparison.

18. Apparatus according to claim 17, further comprising an interface to an external controller separate from said apparatus, said interface being coupleable through the external controller to at least one other network device and altering the probability values stored in said memory to indicating new connection allowance probability values in response to algorithm constants and determined actual connection values in each identified pipe relative to guaranteed connection values for those pipes.

19. Apparatus according to claim 17, wherein said controller alters the probability values indicating new connection allowance probability in response to algorithm constants and actual current connection number data for each of said pipes relative to guaranteed data connection valves for those pipes.

20. Apparatus according to one of claims 18 or 19, further comprising a management component which initializes the algorithm constants and guaranteed data connection values for pipes.

21. Apparatus according to claim 19, wherein said controller responds to a signal from a packet forwarding device communicating with said apparatus indicating the existence of excess connection capacity within that forwarding device that affects a pipe flowing through said apparatus by altering the table of values stored in said memory.

22. Apparatus according to claim 18, wherein said interface passes to the external controller a signal from said apparatus indicating excess connection capacity within said apparatus that affects a pipe flowing through said apparatus.

23. Apparatus according to one of claims 21 or 22, wherein said signal includes multiple components each of which corresponds to the existence of excess connection capacity within a different set of processing resources, said pipes flowing through said apparatus being grouped according to which shared resources they direct data to, and wherein the assignment of said values is performed separately for each group of pipes.

24. Apparatus comprising:
   an interface between a network such as the Internet and an edge resource and
   an excess connection capacity monitoring device operatively coupled to said interface, said excess connection capacity monitoring device monitoring connection numbers in said interface and in said edge resource and generating at least one signal indicating the existence of an excess connection capacity state in said interface and said edge device.

* * * * *